Oct. 17, 1939.    H. G. DOLL    2,176,169
METHOD AND ARRANGEMENT FOR DETERMINING THE DIRECTION AND
THE VALUE OF THE DIP OF BEDS CUT BY A BORE HOLE
Filed July 23, 1936    3 Sheets-Sheet 1

Inventor-
Henri Georges Doll
By Mauro + Lewis
Attorney

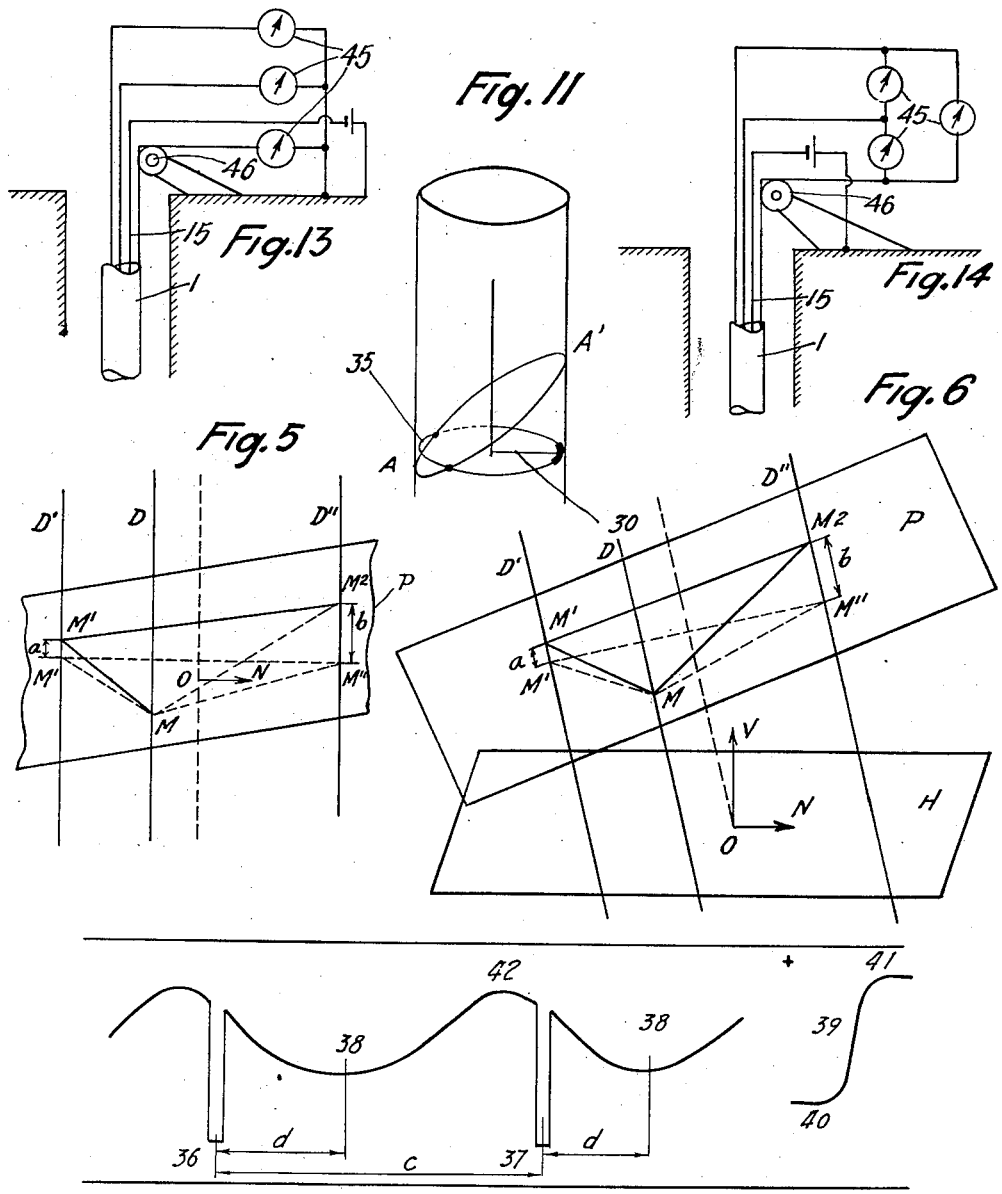

Oct. 17, 1939.  H. G. DOLL  2,176,169
METHOD AND ARRANGEMENT FOR DETERMINING THE DIRECTION AND
THE VALUE OF THE DIP OF BEDS CUT BY A BORE HOLE
Filed July 23, 1936   3 Sheets-Sheet 3

Patented Oct. 17, 1939

2,176,169

UNITED STATES PATENT OFFICE 2,176,169

METHOD AND ARRANGEMENT FOR DETERMINING THE DIRECTION AND THE VALUE OF THE DIP OF BEDS CUT BY A BORE HOLE

Henri Georges Doll, Paris, France, assignor to Societe de Prospection Electrique, Procedes Schlumberger, Paris, France, a corporation of France Application July 23, 1936, Serial No. 92,228
In France March 18, 1936

35 Claims. (Cl. 175—182)

The possibility of determining the characteristics of the dip of sedimentary strata traversed by bore holes is of great practical interest. These characteristics are given by the amount or value of dip (angle made by the plane of the bed with a horizontal plane) and by the direction of dip (in relation to geographical north, for instance); it is moreover recalled that the strike of a bed is given by the direction of the horizontal line in the plane of the bed, and is therefore perpendicular to the direction of the dip.

If in fact it is desired to bore a second hole in the neighbourhood of the first, the indications obtained will make it possible to determine beforehand at about what depth this second bore hole will encounter a bed already met by the first at a certain level. If in addition it has been possible to determine the exact value of the dip, one will naturally have much more valuable indications.

The object of the present invention is a new method whose practical application requires only a relatively simple apparatus which can easily be operated.

This invention makes use of the phenomenon described below and known under the name "spontaneous polarisation", which phenomenon has already been described and employed for other purposes in U. S. A. Patent No. 1,913,293 to Conrad Schlumberger, June 6, 1933.

The following is a description of the phenomenon of "spontaneous polarisation". In a bore hole filled with water or mud, electric currents are generated spontaneously at the depth of the porous beds, these being due in particular, as has been discovered and provided, to the phenomena of electro-filtration, and these currents give rise themselves to potential differences which can easily be measured.

These phenomena can be demonstrated by immersing in the water or mud filling the bore hole a movable insulated electrode connected at the surface to a potentiometer of which the other terminal is grounded; it will then be seen that when the movable electrode reaches the level of the porous beds the potentiometer indicates the potential differences in question.

In said Patent No. 1,913,293 of June 6, 1933, these variations of potential differences obtained by displacing the movable electrode vertically in the bore hole are recorded on a diagram, which is afterwards utilised to ascertain the presence and the depth of the porous beds in question.

The present invention is based on the fact that the differences of potential recorded on the diagrams in question vary in a very abrupt manner in passing from a porous bed to a non-porous bed and vice versa, and generally from a more porous to a less porous bed and vice versa, and are clearly visible on the recorded diagram with a displacement of the electrical measuring device of only a very few centimetres.

Now if we suppose as shown in Figure 1 of the accompanying drawings, that a bore hole S of cylindrical shape and strictly vertical cuts a porous bed at a certain angle, this angle is equal to the angle of dip of this bed, and the intersection of the plane of separation P of the two beds (non-porous and porous) with the walls of this bore hole is an inclined ellipse E of which the opposite vertices or extremities AA' are at substantially different levels.

As a result, if the spontaneous potentials are measured at points N and N' located at the same level in the bore hole but situated on different sides of the plane of the ellipse E and in the neighbourhood of the walls of this bore hole, different values will obviously be obtained, since the point N is opposite a porous bed, for example, while the point N' is opposite a non-porous bed.

Thus when the bore hole cuts porous and non-porous beds inclined in relation to its axis, the spontaneous potentials which exist in this bore hole vary not only in terms of the depth but likewise, for points situated at the same level, in terms of the position of these points in relation to the walls of the bore hole, and these potential variations will themselves be a function of the orientation and of the value of the dip of the beds.

The invention then essentially consists in recording these spontaneous potential differences existing in the bore hole at points which are not all located on the axis of the bore hole, but of which certain ones are on the contrary selected preferably near the wall of the bore hole, so as to make it possible to deduce therefrom the orientation of the dip and if desired the value of this dip.

The putting into practice of the method consists preferably, in accordance with the invention, in moving in the bore hole one or more electrodes which are caused to describe known trajectories passing preferably in the neighbourhood of the walls of the bore hole, and in measuring the potential differences existing between the movable electrode or electrodes and a fixed point of the ground, or between these electrodes taken in pairs, for different positions occupied by the electrodes in their trajectory. The results obtained will be preferably put into the form of diagrams which will then serve to determine the orientation of the inclination of the beds and if desired the value of the angle of inclination of these beds in relation to the axis of the bore hole.

When the bore hole is not substantially vertical, measurement is also made preferably by any known method of the inclination of the bore hole in relation to the vertical and the geographical direction of this inclination, and from this are deduced the corrections which should be applied to the elements of the dip determined as above so as to obtain the orientation of the dip in relation for instance to the geographical north and the value of the angle of dip in relation to the horizontal.

One method of carrying out the invention consists in a plurality of electrodes displaced simultaneously in the bore hole, their relative position being known, and these electrodes are then caused to describe straight lines parallel to the axes of the bore hole; the spontaneous potential variations which are produced either between the electrodes taken in pairs or preferably between each of the electrodes and a fixed point of the ground are then recorded in terms of the depth. The comparison of the different diagrams obtained makes it possible to determine by simple calculation, graphically or otherwise, the inclination of the beds traversed in relation to the axis of the bore hole.

There will moreover be added preferably to the electrodes any suitable means for determining the orientation and the inclination of the bore hole. It is thus possible by comparing these different results to deduce from them the orientation and the value of the dip.

In another manner of execution an electrode is lowered to the neighbourhood of the plane of separation between the porous bed and the non-porous bed, and this electrode is caused to describe a trajectory, preferably circular, in a plane perpendicular to the bore hole axis, so that it moves in proximity to the walls; the curve of potential recorded while the electrode describes its trajectory then makes it possible to determine the orientation of the beds.

The invention includes means, hereinafter described, for practicing the said method.

In one embodiment of such operating means, the measuring electrodes are stationary in relation to the body of the apparatus. They are preferably arranged in the same plane perpendicular to the axis of the apparatus and are preferably three in number placed at the angles of an equilateral triangle and kept at a short distance from the walls of the bore hole.

In another embodiment a single electrode is utilised which is capable of being rotated by means of a suitable motor about the axis of the apparatus.

The measurements of the differences of potential may be effected by any suitable means, such for example as described in U. S. A. Patent No. 1,980,100 of November 6, 1934.

Other characteristics of the invention will appear in the course of the following description in conjunction with the accompanying drawings, which show diagrammatically and by way of non-limiting examples some methods by which the invention can be put into practice.

In the drawings—

Figure 1:
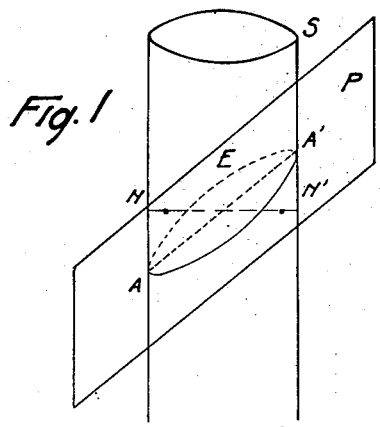
Figure 1 is an explanatory schematic view which has already been referred to above.
Figure 3:
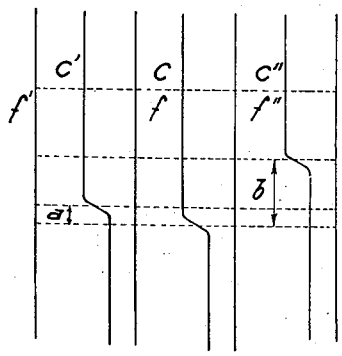
Figure 4:
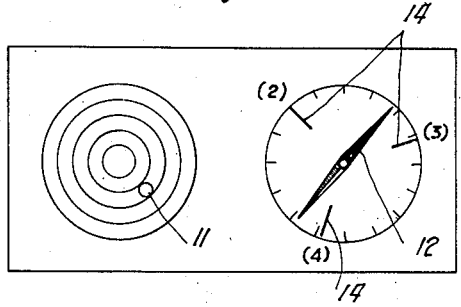
Figure 2:
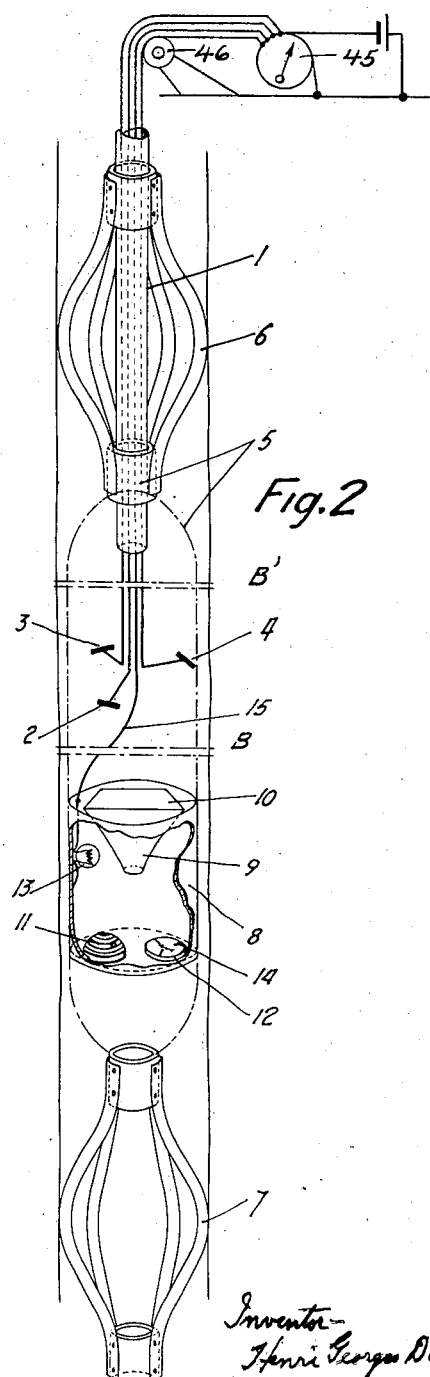
Figure 2 is an assembly view of apparatus comprising three electrodes placed one at each of the angles of an equilateral triangle in a plane perpendicular to the axis of the apparatus.
Figure 7:
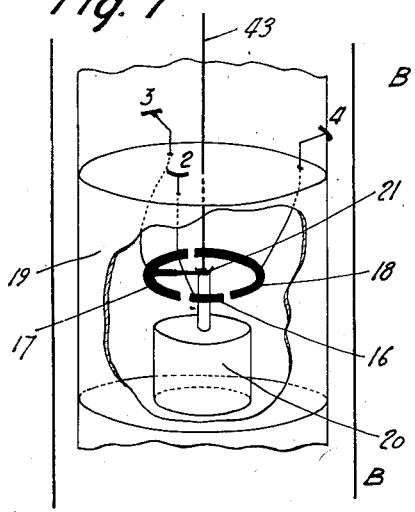
Figure 8:
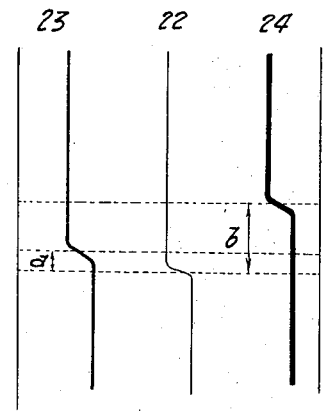
Figure 9:
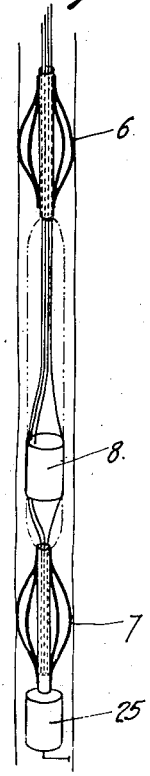
Figure 10:
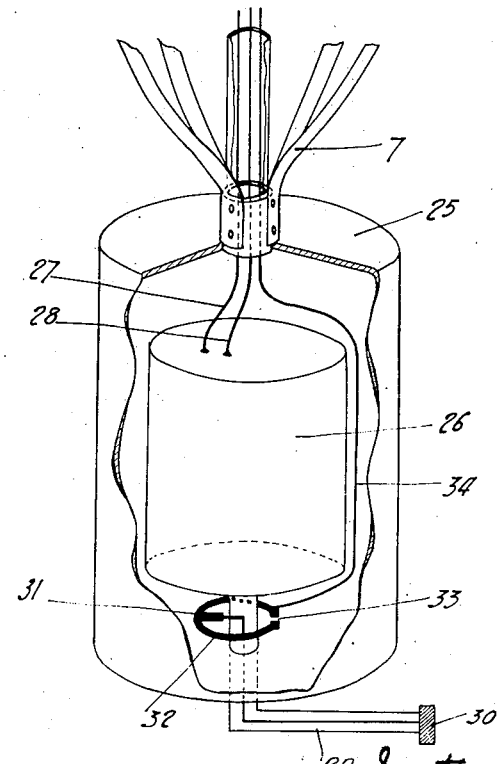

Figure 3 shows an example of the diagram obtained by means of this apparatus in which the potential differences are measured between each electrode and a fixed point of the ground, Figure 4 shows the photographic image obtained with the apparatus serving to determine the orientation of the electrodes, as also the inclination of the axis of the bore hole and the direction of this inclination, Figure 5 is a diagrammatical view showing how the orientation and the value of the dip can be deduced from the diagrams obtained when the axis of the bore hole is assumed to be vertical, Figure 6 is a diagrammatical view showing how the same information can be deduced from the diagrams when the axis of the bore hole is not vertical, Figure 7 shows a modification of the apparatus of Figure 2, but only the parts of the apparatus which have been modified, Figure 8 represents the diagram obtained with this modified apparatus, Figure 9 shows another form of construction comprising a single movable electrode actuated to describe a circular trajectory perpendicular to the axis of the bore hole, Figure 10 shows certain details of the same apparatus on a larger scale, Figure 11 is a diagrammatical view illustrating the operation of this apparatus, Figure 12 represents a diagram obtained by means of this constructional form, Figure 13 illustrates apparatus at the earth's surface for measuring potentials between the electrodes in the hole and ground; and Figure 14 shows the connections to the measuring apparatus when the potentials are measured between the electrodes taken in pairs.

Referring to Figure 2, I is the supporting cable for the apparatus, the apparatus itself being immersed in the water or mud filling the bore hole. Cable I is made up of four insulated conductors, three of which terminate respectively at the electrodes 2, 3 and 4. 5 denotes the rigid body of the apparatus which contains the three conductors, terminating respectively at the electrodes 2, 3 and 4, and also a conductor 15 the function of which will be described hereinafter.

The three electrodes 2, 3 and 4 are carried by three lateral arms in such a way as to lie at the respective angles of an equilateral triangle in a plane perpendicular to the axis of the body 5 of the apparatus. They are so mounted in any suitable manner as to be, when in operation within a short distance of the wall of the bore hole.

Body 5 is provided with centering devices 6 and 7, one at each end, which may be formed in a known manner of four strips, as shown, and making yielding contact with the walls of the bore hole.

These centering devices serve also to prevent the rotation of the apparatus in the bore hole while permitting it to move vertically.

These four strips can also be, and preferably are, made of or coated with insulating material for the purpose of obviating the production of electrical disturbances.

The apparatus can be equipped with any known or suitable means whereby the orientation and, if desired, the direction and inclination of the bore hole axis may be determined. Devices suitable for this purpose are shown diagrammatically at 8. This arrangement comprises for example a photographic camera with a lens 9, a photographic plate 10, a spherical spirit-level 11 and a compass 12. On the mounting of the compass three reference marks 14 may also be provided to correspond with the positions of the three electrodes. The apparatus further comprises an illuminating device in the form, for example, of an electric lamp 13 which can be fed, as shown in the figure, by a source of current located at the surface of the ground and connected to the lamp by means of the supplementary conductor 15, the return connection being through the ground. Obviously one of the conductors (2, 3, 4) could be used as the return connection; in which case, however, an alternating current would preferably be used in order to avoid polarization of the electrodes.

When the apparatus has been lowered to the depth at which it is desired to make measurements, the bulb 13 is lit up by any known means; if this bulb is fed from a source of current at the surface of the ground the lighting up is effected by simply closing the electric circuit. The photographic plate 10 then records, as shown in Figure 4.

Firstly, the position of the magnetised needle of the compass 12, which gives the orientation of the apparatus, and in particular that of the electrodes and of the axes of the spirit-level, and secondly, the position of the bubble 11 of the spherical spirit-level, which gives the inclination of the axis of the bore hole and the direction of this inclination in relation to the magnetic north.

Thereupon, or at the same time, the continuous recording in terms of the depth, by means of the electrodes 2, 3 and 4, of the spontaneous potential differences applied to the electrodes is carried out.

The electrodes 2, 3 and 4 are assumed to be connected, at the surface of the ground for example, to three potentiometers 45, which may be connected to the ground as shown in Figure 13 for measuring potentials between ground and the electrodes. If it is desired to measure potentials between the electrodes taken in pairs, the connections to the potentiometers 45 should be made as indicated in Figure 14. By means of the potentiometers 45, a continuous record can be made on three diagrams of the potential differences produced by spontaneous polarisation. The strips of paper on which these diagrams are recorded are displaced proportionally to the depths by means of for instance a pulley or wheel of suitable diameter, as indicated at 46, Fig. 2, pressed against, and moved by the supporting cable. Preferably these diagrams are traced at a considerable depth scale, for example $\frac{1}{10}$ or even $\frac{1}{5}$.

If it is assumed, for example, that the bore hole intersects two beds one porous and the other non-porous bounded mutually by the plane P, there are obtained the three diagrams C, C' and C'' of Figure 3. Depth references $f$, $f'$ and $f''$ marked simultaneously on the three diagrams in the course of recording make it possible to align and compare the three diagrams.

These diagrams are similar but displaced in relation to each other, and in fact one can be obtained from any other by a simple longitudinal transposition.

It will now be explained how these diagrams can be used to determine the characteristics of the dip. To simplify the explanation, it will first be assumed that the bore hole in question is substantially vertical, which in fact is frequently the case.

Measurement is made for example of the distances $a$ and $b$ (as marked in Figure 3) which exist between the diagram C corresponding to the electrode 2 and the diagrams C' and C'' corresponding respectively to the electrodes 3 and 4.

In Figure 5 the straight lines D, D' and D'' represent in perspective the trajectories of the electrodes 2, 3 and 4 during the recording, that is to say practically three lines parallel to the axis of the bore hole. If these three lines, vertical by hypothesis, are cut by a horizontal plane, three points M, M' and M'' are obtained. It is then sufficient to set off on the straight line D' from M' the length $a$ and on the straight line D'' starting from M'' the length $b$, making allowance of course for the depth scale adopted for the record. Points $M_1$ and $M_2$ are thus obtained such that the points M, $M_1$ and $M_2$ determine the boundary plane P between the beds.

At the same time, in the horizontal plane M, M', M'' the direction N of the north is given in relation to the triangle M, M', M'' by the position of the needle of the compass 12 on the photographic plate as shown in Figure 4.

It will be seen immediately in this construction that, by means of the data furnished by the apparatus, the position of the plane P is completely determined in relation to that of the horizontal plane and the direction ON of the north. It is consequently possible by any suitable method (calculations, graphs, and such like), to deduce therefrom the orientation and the value of the dip.

An examination will now be made of the case in which the bore hole is not exactly vertical, reference being made here to Figure 6. In this case, as shown on the photographic plate (Fig. 4), the bubble 11 is no longer at the centre of the level but occupies a certain position which determines on one hand the angle which the axis of the bore hole makes with the vertical and on the other hand the direction of the vertical in relation to the three lines D, D' and D''. From any point O on the axis of the bore hole the direction OV of this vertical can therefore be traced as shown in Figure 6.

The plane perpendicular to OV is then a horizontal plane, and in this plane the magnetised needle gives the direction ON of the north. For this condition to be rigorously fulfilled, the further precaution may be taken of using a compass needle mounted on a Cardan suspension, so that the axis of rotation of the needle may always be vertical.

By thus using the construction illustrated in Figs. 2 and 4, one is able to obtain from points M, M' and M'' situated in a plane perpendicular to D, D' and D'' points M, $M_1$ and $M_2$ which determine the plane P. The position of this plane is thus completely determined in reference to the horizontal plane H and the direction ON of the north. As in the previous case it is thus possible to deduce from this information the characteristics of the dip by any process (calculations, graphs and such like).

It should be emphasized moreover that a simple examination of the diagrams makes it possible to check whether the measurements have been properly made. As has already been mentioned above, the three diagrams obtained must be capable of superposition. If this is not the case, the reason is that the measurements are incorrect or because the dip is irregular.

Figure 7 shows a modification of the arrangement of Figure 2. This modification differs therefrom in that the three electrodes 2, 3 and 4 are not connected separately to the ground by three different conductors, but are connected respectively to three segments of a collector which are connected in alternation to a single electric conductor passing to the measuring instrument or instruments. In the following description it is assumed that there is actually only one measuring instrument. In Figure 7 the electrodes 2, 3 and 4 are connected respectively to the commutator segments 16, 17 and 18 against which a brush 19 is moved by a motor 20. On the other hand, this brush is in communication by means of a contact 21 with a conducting wire 43 passing to the measuring instrument.

The motor 20 can be actuated in any suitable way; it may be a clockwork motor of which the release is effected in any suitable manner at the time when the measurements are to begin; or it may be an electric motor driven from any suitable, and suitably located, source.

The three segments 17, 18 and 19 of the collector preferably occupy different lengths of arc for a purpose which will be explained hereinafter.

The conducting wire 43 may be connected at the surface to any known or suitable recording device, such as an oscillographic multivoltmeter.

This arrangement operates in the following way:

The apparatus is lowered into the bore hole to the level at which it is desired to take measurements, the motor is set in motion and drives the brush 19 round the collector at a speed for example of the order of one revolution per second. The three electrodes 2, 3 and 4 are thus severally and independently put into communication with the conductor 43, and the recording member of the oscillographic millivoltmeter records in succession for each rotation of the brush 19 the potential differences measured by the electrodes 2, 3 and 4, passing each time abruptly from one recorded value to the next.

The indications of this millivoltmeter are recorded for example on a strip of photographic paper which moves in accordance with the depth of the electrodes, and the record shown in Figure 8 is obtained in which three diagrams 22, 23 and 24 correspond respectively to the potential differences between the three electrodes 2, 3 and 4 and any fixed point at the surface of the ground. The curves 22, 23 and 24 will ordinarily coincide when the electrodes are in the neighborhood of homogeneous formations, but for purposes of discussion and clarity in understanding the operation of the apparatus, the three curves in Figure 8 are shown as being entirely distinct.

These three diagrams 22, 23 and 24 thus correspond exactly to the three diagrams C, C' and C'' of the previous case. Now the commutator segments 16, 17, and 18 do not embrace the same length of arc and therefore the three diagrams 22, 23 and 24 are not traced with the same thickness. The diagram 22 which corresponds to the narrowest segment 16 is traced in the form of a light mark; the diagram 23 corresponding to the segment 17, and correspondingly to the electrode 3, is traced in the form of a heavier mark, and finally the diagram 24 corresponding to the segment 18, and consequently to the electrode 4, is traced in the form of a still heavier mark. It is thus easily possible to identify the diagram corresponding to each electrode. The orientation of each electrode is given as in the previous case by photographing the compass, and accordingly the orientation and the value of the dip of the beds is effected in exactly the same way as before.

Figure 9 shows a constructional form in which the measurements of potential differences are effected by means of an electrode movable about the axis of the bore hole. The body itself of the apparatus is similar to that of Figure 2 and comprises as before centering members 6 and 7 and apparatus 8 by which the inclination and the orientation of the bore hole axis can be determined.

Beneath the lower centering member 7 is arranged the apparatus by which the displacements of the electrode are controlled, which apparatus is contained in a water-tight box 25 filled with oil. This box is shown in Figure 10 on a larger scale. It contains a motor with reduction gear 26 driven by means of two electric conductors 27 and 28 for example. The motor could be driven in any other way. It rotates an insulating arm 29 to which it imparts a constant speed of the order one revolution per minute for example. This insulating arm carries at its extremity the electrode 30, which is connected by an insulated lead running inside the arm 29 to a brush 31 rotating inside the box 25. As this brush rotates with the arm 29 it maintains contact with a circular commutator 32, which comprises a single ring with a narrow break 33. This commutator is connected by a lead 34 to a measuring apparatus, such as a millivoltmeter or potentiometer, placed at the surface of the ground and having its other terminal grounded.

The apparatus shown in Figs. 7-9 operates in the following way:—

A porous bed having been located with precision at a particular depth by a method according to U. S. A. Patent No. 1,913,293 of June 6, 1933, mentioned above, the apparatus is lowered in the bore hole so as to bring the arm 29 with the electrode 30 to the level already determined as being the boundary plane between the porous and non-porous beds. The diagram of Figure 11 shows how this level is located between the levels A and A', the vertices of the ellipse which forms the trace of the boundary plane between the porous and non-porous beds. If then the electrode 30 is rotated by means of the motor 26, the electrode will describe a circle 35 passing in turn to one side and the other of the plane P, that is to say it moves in alternation in front of a porous wall and a non-porous wall. The potential differences existing at each moment between the electrode 30 and any fixed point in the ground will consequently vary between a maximum and a minimum, which will correspond to the passage of the electrode through positions in the direction of the greatest slope of the plane P. These potential differences are recorded at the surface of the ground by means of a recording millivoltmeter in which the record paper is moved at a constant speed. Figure 12 shows an example of a diagram obtained by this method. This diagram is generally of sinusoidal shape, each period of this sine curve corresponding to a complete rotation of the electrode 30. It is easy to determine the maxima and minima on this diagram, which as already mentioned correspond to the passage of the electrode past the positions of the line of greatest slope of the bed passing through the axis of the bore hole.

Moreover, as has been mentioned above, the collector 32 has a gap 33, the position of which in the apparatus is known and is marked for example on the face of the compass contained in the photographic apparatus.

When the brush 31 passes over this gap the current coming from the electrode 30 to the potentiometer is interrupted, and there are thus obtained on the diagram sudden breaks indicated at 36 and 37 in Figure 12. Since the orientation of the electrode when these breaks are registered is known by the method indicated above, and since the electrode and the paper both move at constant speeds, it is very simple to calculate the orientation of the electrode which corresponds to each of the points of the diagram and in particular that which corresponds to the maxima and minima giving the direction of dip.

If $c$ is the distance comprised on the diagram between the breaks 36 and 37 and $d$ the distance between 36 and the minimum 38 of the sine curve, the quantity $$\frac{2\pi d}{c}$$

expressed in radians will obviously be the measurement of the angle through which the electrode 30 has turned in moving from the position in which the brush 31 passes over the gap 33 to the position corresponding to the direction of line of greatest slope of the plane P, that is to say the direction of dip. Since, on the other hand, the photographic apparatus 8 of Figure 2 makes it possible to determine the orientation of the electrode 30 in the bore hole with reference to geographical directions, such as north, when the brush 31 is on the gap 33, all that is necessary is to add this angle to the angle of which the value is given above to obtain the required direction of the dip.

It remains to determine the direction of the line of greatest slope of the bed. For this purpose the motor 26 of the apparatus is stopped so as to render the electrode 30 stationary while it remains in electric communication with the measuring apparatus, and the whole assembly is moved vertically in the bore hole from its initial position, so that the electrode is caused to traverse, upwards for example, the boundary plane between porous and non-porous beds already explored. At the same time the spontaneous potential differences are recorded and this may be effected on the same diagram as before.

In passing over the boundary plane P between the porous and non-porous beds the electrode 30 will record a variation of potential difference. Let us suppose that this potential difference is recorded on the same strip as the previous diagram and that it has the form indicated at 39 when the apparatus is moved upwards. The part 40 of the diagram recorded for a position below the boundary plane is by hypothesis at the side of the minima 38 and the part 41 recorded above the plane P is by hypothesis on the side of the maxima 42. It can thus be deduced that in the bore hole the point corresponding to the maximum 42 is nearer the upper bed than the point corresponding to the minimum 38. Accordingly when the electrode 30 takes up the position corresponding to the position of the maximum 42, it is in the direction towards which the strata dip downwards, that is to say the direction of dip. The characteristics of dip are thus fully determined.

It is of course possible to make various modifications in the methods and arrangements described without passing beyond the scope of the present invention.

In particular the apparatus for measuring the inclination of the bore hole and the direction of this inclination can be constructed in any suitable manner. It would obviously be possible to use for this purpose apparatus of the type described in United States Patent No. 1,980,100, thereby making a continuous record of the inclination of the bore hole axis.

The number and the disposition of the electrodes are not restricted to those described and illustrated herein; these being given merely as examples. The measurement and the recording of the potential differences can obviously be effected by means of any of the appliances commonly used for that purpose.

What I claim is:

1. The method of determining the direction of the dip of the formation cut by a bore hole which comprises the steps of measuring and comparing the spontaneous potential differences existing in the bore hole in the vicinity of contact between porous and non-porous beds and more generally between more and less porous beds in zones situated away from the axis of the bore hole and having different orientations in relation to the axis in question.

2. The method of determining the direction and the value of the dip of the formation cut by a bore hole which comprises the steps of measuring and comparing the spontaneous potential differences existing in the bore hole in the vicinity of contact between porous and non-porous beds and more generally between more and less porous beds in zones situated away from the axis of the bore hole and having different orientations in relation to the axis in question.

3. The method of determining the direction of the dip of the formation cut by a bore hole which comprises the steps of moving in this bore hole an electrode which is caused to describe a known trajectory not coincident with the axis of the bore hole and in recording the spontaneous potential differences which exist between the said movable electrode and a fixed point of the ground and comparing therebetween said spontaneous potential differences.

4. The method of determining the direction and the value of the dip of the formations cut by a bore hole which comprises the steps of moving in the bore hole a plurality of electrodes which are caused to describe known trajectories not coincident with the axis of the bore hole and in measuring the spontaneous potential differences existing between the said electrodes and a fixed point of the ground and comparing said measured spontaneous differences of potential to determine the value of the dip.

5. The method of determining the direction and the value of the dip of the beds traversed by a bore hole which comprises the steps of moving in the bore hole a plurality of electrodes which are caused to describe known trajectories and in measuring and comparing the spontaneous potential differences existing between the said electrodes taken in pairs.

6. The method of determining the direction of the dip of the strata cut by a bore hole which comprises the steps of moving in the bore hole a plurality of electrodes along known trajectories not coincident with the axis of the bore hole, in measuring and comparing the potential differences existing between the various electrodes and a fixed point of the ground and in determining the orientation of the said electrodes in the bore hole with respect to the axis of the bore hole in the various positions which they occupy.

7. The method of determining the direction of the dip of the strata cut by a bore hole which comprises the steps of moving in the bore hole a plurality of electrodes along known trajectories not coincident with the axis of the bore hole, in measuring and comparing the potential differences existing between the various electrodes and a fixed point of the ground, in determining the orientation of the said electrodes in the bore hole away from the axis of the bore hole in the different positions which they occupy and in determining the inclination of the bore hole.

8. The method of determining the direction of the dip of the strata cut by a bore hole which comprises the steps of lowering an electrode into the bore hole to the neighbourhood of the boundary plane between porous and non-porous beds, and more generally between more and less porous beds in causing it to describe a circular trajectory in a plane perpendicular to the bore hole axis and in recording the potential difference between this electrode and a fixed point of the ground at different angular displacements of this electrode and comparing the successive values of said potential difference.

9. The method of determining the direction of the dip of the beds cut by a bore hole which comprises the steps of lowering into the bore hole to the neighbourhood of the porous and non-porous beds and more generally of more and less porous beds a plurality of electrodes arranged in a circle perpendicular to the bore hole axis and in measuring and comparing the potential differences between these various electrodes and a fixed point of the ground.

10. An arrangement for determining the direction of the dip of the strata out by a bore hole comprising a body adapted to be moved in the interior of the bore hole, an electrode movable in relation to this body and means for measuring the potential difference between this electrode and a fixed point of the ground for each angular position of the electrode.

11. An arrangement for determining the direction and the value of the dip of the strata cut by a bore hole comprising a body adapted to be moved in the interior of the bore hole, a plurality of electrodes fixed in relation to this body and de-centered in relation to the axis of the said body, and means for measuring the potential differences between the various electrodes and a fixed point of the ground.

12. An arrangement for determining the direction and the value of the dip of the strata cut by a bore hole comprising a body adapted to be moved in the interior of the bore hole, a plurality of electrodes fixed in relation to this body and de-centered in relation to the axis of the said body and means for measuring the spontaneous potential differences between the said electrodes taken in pairs.

13. An arrangement for determining the direction and the value of the dip of the strata cut by a bore hole comprising a body adapted to be lowered into the bore hole, electrodes connected to this body decentered relatively to the axis of the bore hole and immersed in the mud or water filling the bore hole, means for measuring the potential differences existing between these electrodes and a fixed point of the ground and a device for measuring the orientation of the electrodes in the bore hole with respect to the axis of the bore hole.

14. An arrangement for determining the direction and the value of the dip of the strata cut by a bore hole comprising a body adapted to be lowered into the bore hole, electrodes connected to this body decentered relatively to the axis of the bore hole and immersed in the mud or water filling the bore hole, means for measuring the spontaneous potential differences existing between these electrodes taken in pairs and a device for measuring the orientation of the electrodes in the bore hole with respect to the axis of the bore hole.

15. An arrangement for determining the direction and the value of the dip of the strata cut by a bore hole comprising a body adapted to be moved in the interior of the bore hole, a plurality of electrodes fixed in relation to this body and de-centered in relation to the axis of the said body, means for measuring the potential differences between the various electrodes and a fixed point of the ground and means for measuring the inclination of the bore hole.

16. An arrangement for determining the direction and the value of the dip of the strata cut by a bore hole comprising a body adapted to be moved in the interior of the bore hole, a plurality of electrodes fixed in relation to this body and de-centered in relation to the axis of the said body, means for measuring the spontaneous differences between these electrodes taken in pairs and means for measuring the inclination of the bore hole.

17. An arrangement for determining the direction and the value of the dip of the strata cut by a bore hole comprising a body adapted to be moved in the interior of the bore hole, three electrodes carried by this body and placed at the angles of an equilateral triangle in a plane perpendicular to the axis of the said body and means for measuring the potential differences between these three electrodes and a fixed point of the ground.

18. An arrangement for determining the direction and the value of the dip of the strata cut by a bore hole comprising a body adapted to be moved in the interior of the bore hole, three electrodes carried by this body and placed at the angles of an equilateral triangle in a plane perpendicular to the axis of the said body and means for measuring the spontaneous potential differences between these three electrodes taken in pairs.

19. An arrangement for determining the direction of the dip of the strata cut by a bore hole comprising a body adapted to be moved longitudinally in the interior of the bore hole, an electrode rotatable about the axis of this body, means for causing this electrode to rotate about this axis and means for measuring and recording the potential difference between this electrode and a fixed point of the ground.

20. An arrangement for determining the direction of the dip of the strata cut by a bore hole comprising a body adapted to be moved longitudinally in the interior of the bore hole, an electrode rotatable about the axis of this body, means for causing this electrode to rotate about this axis, a potentiometer arranged at the surface of the ground with one of its terminals grounded, an insulated cable connecting the electrode arranged in the bore hole to the other terminal of the potentiometer and means for interrupting the electric connection between the electrode and the potentiometer when this electrode passes through a predetermined position in its orbit.

21. An arrangement for determining the direction of the dip of the strata cut by a bore hole comprising a body adapted to be moved in the interior of the bore hole, a series of electrodes arranged in a ring and carried by this body, potential measuring apparatus arranged at the surface of the ground with one of its terminals grounded, a member actuated to make electrical contact in succession with the different electrodes and means for electrically connecting the said member to the other terminal of the potential measuring apparatus.

22. An arrangement for determining the direction and the value of the dip of the strata cut by a bore hole comprising a body, electrodes carried by this body, a cable supporting this body by which it can be moved longitudinally in the bore hole, insulated conductors accommodated in this cable and terminating at the different electrodes, sets of measuring apparatus arranged at the surface of the ground and each having one terminal connected to the end of one of the said insulated conductors and the other terminal grounded.

23. An arrangement for determining the direction and the value of the dip of the strata cut by a bore hole comprising a body adapted to be moved longitudinally in the interior of the bore hole, electrodes carried by this body, a potential measuring arrangement located at the surface of the ground with one terminal grounded, an insulated conductor connecting the body to the other terminal of the measuring apparatus and means for putting the different electrodes successively into contact with the insulated conductor.

24. An arrangement for determining the direction and the value of the dip of the strata traversed by a bore hole, comprising a body adapted to be moved in the interior of the bore hole, a plurality of electrodes carried by this body and placed in a plane perpendicular to the axis of said body, and means for measuring the spontaneous potential differences between said electrodes taken in pairs.

25. A method of determining the direction of the dip of the strata traversed by a bore hole, in that part thereof not yet lined with casing, and containing water or mud, which comprises the steps of measuring and comparing at points located away from, and having known angular spacing about the axis of the bore hole the electric field spontaneously existing in said bore hole.

26. A method of determining the direction of the dip of the strata traversed by a bore hole, in that part thereof not yet lined with casing, and containing water or mud, which comprises the steps of measuring and comparing the potential differences spontaneously existing in the bore hole in substantially coplanar points located transversely in said bore hole.

27. A method of determining the direction of the dip of the strata traversed by a bore hole, in that part thereof not yet lined with casing, and containing water or mud, which comprises the steps of measuring and comparing in several points located in a plane intersecting the bore hole and away from the axis thereof, the potential differences spontaneously produced in the liquid filling said bore hole.

28. A method of determining the direction of the dip of the strata traversed by a bore hole, in that part thereof not yet lined with casing, and containing water or mud, which comprises the steps of measuring and comparing in several points located at various depths near the walls of the bore hole in a plane intersecting the bore hole and near the level of separation of successive beds having different chemical composition or porosity, the potential differences spontaneously occurring in the liquid filling the bore hole.

29. An arrangement for determining the direction and the value of the dip of the strata cut by a bore hole comprising a plurality of electrodes fixed in relation to each other and de-centered relatively to the axis of the bore hole, said electrodes being adapted to be moved in the interior of the bore hole, and means for measuring the potential differences between the various electrodes and a fixed point of the ground.

30. An arrangement for determining the direction and the value of the dip of the strata cut by a bore hole comprising a plurality of electrodes fixed in relation to each other and de-centered relatively to the axis of the bore hole, said electrodes being adapted to be moved in the interior of the bore hole, and means for measuring the spontaneous potential differences between the said electrodes taken in pairs.

31. An arrangement for determining the direction and the value of the dip of the strata cut by a bore hole comprising electrodes fixed in relation to each other and de-centered relatively to the axis of the bore hole and adapted to be moved in the interior of the bore hole, and means for measuring the potential differences existing between these electrodes and a fixed point of the ground and a device for measuring the orientation of the electrodes in the bore hole with respect to the axis of the bore hole.

32. An arrangement for determining the direction and the value of the dip of the strata cut by a bore hole comprising a plurality of electrodes fixed in relation to each other and de-centered relatively to the axis of the bore hole, said electrodes being adapted to be moved in the interior of bore hole and means for measuring the potential differences between the various electrodes and a fixed point of the ground and means for measuring the inclination of the bore hole.

33. An arrangement for determining the direction and the value of the dip of the strata cut by a bore hole comprising a plurality of electrodes fixed in relation to each other and de-centered relatively to the axis of the bore hole, said electrodes being adapted to be moved in the interior of the bore hole, means for measuring the spontaneous potential differences between these electrodes taken in pairs and means for measuring the inclination of the bore hole.

34. An arrangement for determining the direction and the value of the dip of the strata cut by a bore hole comprising three electrodes adapted to be moved in the interior of the bore hole, said electrodes being placed at the angles of an equilateral triangle in a plane perpendicular to the axis of the bore hole, and means for measuring the potential differences between these three electrodes and a fixed point of the ground.

35. An arrangement for determining the direction and the value of the dip of the strata cut by a bore hole comprising three electrodes adapted to be moved in the interior of the bore hole, said electrodes being placed at the angles of an equilateral triangle in a plane perpendicular to the axis of the bore hole, and means for measuring the spontaneous potential differences between these three electrodes taken in pairs.

HENRI GEORGES DOLL.